(12) United States Patent
Bayram

(10) Patent No.: US 12,061,155 B2
(45) Date of Patent: Aug. 13, 2024

(54) METHOD AND APPARATUS FOR EVALUATION OF A STATUS OF A MATERIAL IN METALLURGICAL VESSELS

(71) Applicant: PaneraTech, Inc., Chantilly, VA (US)

(72) Inventor: Yakup Bayram, Chantilly, VA (US)

(73) Assignee: PaneraTech, Inc., Chantilly, VA (US)

( * ) Notice: Subject to any disclaimer, the term of this patent is extended or adjusted under 35 U.S.C. 154(b) by 126 days.

(21) Appl. No.: 17/916,895

(22) PCT Filed: Apr. 5, 2021

(86) PCT No.: PCT/US2021/025706
§ 371 (c)(1),
(2) Date: Oct. 4, 2022

(87) PCT Pub. No.: WO2021/207044
PCT Pub. Date: Oct. 14, 2021

(65) Prior Publication Data
US 2023/0152243 A1 May 18, 2023

Related U.S. Application Data

(60) Provisional application No. 63/005,499, filed on Apr. 6, 2020.

(51) Int. Cl.
*G01N 22/02* (2006.01)
*G01B 15/02* (2006.01)

(52) U.S. Cl.
CPC .............. *G01N 22/02* (2013.01); *G01B 15/02* (2013.01)

(58) Field of Classification Search
CPC ........ G01N 22/00; G01N 22/02; G01B 15/00; G01B 15/02; G01B 15/04; G01M 3/00; G01M 3/40
See application file for complete search history.

(56) References Cited

U.S. PATENT DOCUMENTS 9,255,794 B2 * 2/2016 Walton .................... G06F 15/00
9,880,110 B2 * 1/2018 Ruege ................. F27D 21/0021
(Continued)

FOREIGN PATENT DOCUMENTS

FR 2685952 7/1993

OTHER PUBLICATIONS

International Search Report issued in co-pending application No. PCT/US2021/025706 on Jul. 9, 2021.
(Continued)

*Primary Examiner* — Eman A Alkafawi
*Assistant Examiner* — Suresh K Rajaputra
(74) *Attorney, Agent, or Firm* — Whiteford, Taylor & Preston, LLP; Gregory M. Stone

(57) ABSTRACT

Disclosed is an apparatus and method for evaluating a status of a refractory material in metallurgical vessels, including furnaces and ladles, wherein an external structure at least partly surrounding the refractory material impairs the propagation of radiofrequency signals. The apparatus and method are operative to identify flaws and determine the erosion profile and thickness of refractory material and the level or rate of penetration of molten material into the refractory material, using radiofrequency signals. The apparatus comprises an antenna embedded in the refractory material or positioned inside the chamber of the vessel designed to collect data associated with the propagation of radiofrequency signals transmitted by the antenna into the refractory material. Moreover, signal processing techniques allow determining the status of the internal wall of the vessel due to operational wear, age, and presence of flaws, cracks, corrosion, and erosion to improve the operational life and maintenance of the vessel.

21 Claims, 10 Drawing Sheets

(56) References Cited

U.S. PATENT DOCUMENTS

| | | | |
|---|---|---|---|
| 10,054,367 B2 * | 8/2018 | Bayram | F27D 21/0021 |
| 10,151,709 B2 * | 12/2018 | Bayram | G01N 22/02 |
| 2010/0123467 A1 | 5/2010 | Andarawis et al. | |
| 2013/0144554 A1 | 6/2013 | Walton et al. | |
| 2015/0362439 A1 | 12/2015 | Bayram et al. | |
| 2017/0131033 A1 | 5/2017 | Bayram et al. | |
| 2017/0234808 A1 | 8/2017 | Ruege et al. | |

OTHER PUBLICATIONS

European Search Report and Written Opinion issued in copending application No. 21783959.6 on Mar. 15, 2024.

\* cited by examiner

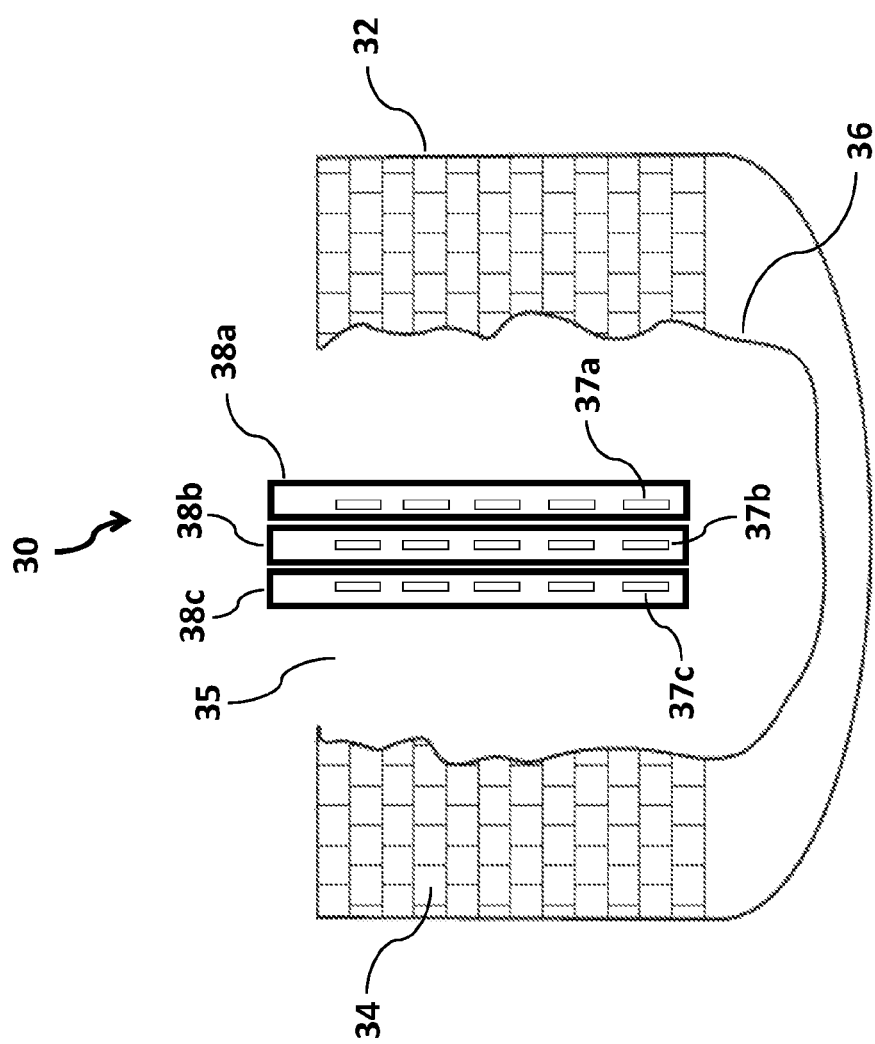

METHOD AND APPARATUS FOR EVALUATION OF A STATUS OF A MATERIAL IN METALLURGICAL VESSELS

CROSS REFERENCE TO RELATED APPLICATION

This application is based upon and claims priority from U.S. Provisional Patent Application Ser. No. 63/005,499, entitled "METHOD AND APPARATUS FOR EVALUATION OF A STATUS OF A MATERIAL IN METALLURGICAL VESSELS," filed with the U.S. Patent and Trademark Office on Apr. 6, 2020, by the inventor herein, the specification of which is incorporated herein by reference.

FIELD OF THE INVENTION

The present invention relates generally to systems and methods for evaluating the status of a material. More particularly, the present invention relates to sensing systems and methods for monitoring and determining the condition of refractory material using radiofrequency (RF) signals.

BACKGROUND OF THE INVENTION

A number of evaluation methods and apparatuses have been disclosed within various industries for measuring the properties during and after formation of certain materials, using RF signals. The surface characteristics, internal homogeneity, residual material thickness, rate of erosion of a material, and level and rate of penetration of a first material into a second material are some of the important attributes that may require monitoring and evaluation. Notably, the type and disposition of the sensors around the material under evaluation play a crucial role in determining the extent to which these attributes can be measured.

In particular, metallurgical industries use large vessels such as furnaces and ladles to melt the raw material used for processing. They are a key asset for manufacturers in terms of costs and operational functionality. In order to minimize the internal heat loss at high operating temperatures, these furnaces and ladles are constructed using refractory material, having very high melting temperatures and good insulation properties, to create a refractory melting chamber. However, the inner refractory walls of the furnaces and ladles will degrade during operation. The effects of this degradation include refractory erosion, refractory corrosion, stress cracks, and refractory material diffusion into the molten material. On the other hand, as the refractory material degrades over time, the molten material may penetrate into the refractory material, accelerating the degradation process and creating a high risk for molten material leakage through the refractory wall with potentially devastating consequences.

Specifically, the use of microwave signals to measure the thickness of materials such as furnace walls has been addressed in the prior art, as described in U.S. Pat. No. 6,198,293 to Woskov et al. and U.S. Pat. No. 9,255,794 to Walton et al. However, these efforts have faced certain challenges and limitations. In particular, these attempts made to determine furnace wall thickness on hot furnaces have been challenged by the large signal losses involved in evaluating the inner surface of refractory materials, especially by using a microwave signal transmitted from outside the furnace at relatively high frequency bands. Likewise, at relatively low frequency bands signals still experience losses and are limited in terms of the bandwidth and resolution required by existing systems. Moreover, in placing system components close to the surface of the refractory material to be evaluated, spurious signal reflections make it difficult to isolate the reflected signal of interest, thus further complicating the evaluation of the status of either the inner surface or the interior of such materials. A major challenge is that furnace walls become more electrically conductive as temperature increases. Therefore, signals going through a hot furnace wall experience significant losses making the detection of these signals very challenging. Additionally, in most cases the monitoring sensors require direct physical access to the refractory material under evaluation and are sensitive to the presence of certain objects nearby, especially those made of metallic material.

Additional efforts have been made to evaluate the status of a material, using electromagnetic waves, by reducing the losses and level of spurious signals involved in evaluating refractory materials, as described in U.S. Pat. No. 10,151,709 to Bayram et al., U.S. Pat. No. 9,880,110 to Ruege et al., and U.S. Pat. No. 10,054,367 to Bayram et al. However, these systems are primarily aimed towards mitigating multiple reflection effects of the electromagnetic waves used in order to reduce the clutter associated with a received signal. In addition, these attempts have focused on standalone systems transmitting electromagnetic waves from outside the furnace into the refractory material. As a result, these efforts become ineffective in the case of a furnace or ladle surrounded by either an outer shell or certain supporting structures, wherein such shell and structures are made of a highly conductive material and impair the propagation of electromagnetic waves through them, or for applications in areas of difficult access where an external evaluation system cannot be properly set up.

The specifications of each of the foregoing referenced U.S. patents are incorporated herein by reference in their entireties.

Particularly in steel metallurgy, a blast furnace or electric arc furnace is used for high-speed melting of the steel and carrying out metallurgical reactions to adjust the final chemical composition of the steel. Later, molten steel is transported to a ladle for further refining. Steel treatment in the ladle includes the addition of deoxidizers, slag formers, desulfurizers, and alloying agents. These additives along with the high temperatures at which the ladle operate accelerate and significantly contribute to a severe stress, wear, and degradation of both the internal walls and the bottom of the ladle. In particular, electric-arc furnaces, with a capacity of up to 50 tons and more, and ladles are largely used to produce steel. These ladles need to be subject to maintenance for removal of residues and inspection, and sometimes repaired as often as on a weekly basis. Similarly, steel manufacturing may also involve blast furnaces, which is subject to a continuous melting operation. These furnaces have a steel lining outside with a refractory inside that is interacting with the molten material. As the refractory degrades, the blast furnace needs to be maintained to ensure no unscheduled production disruption.

Moreover, the flow of molten material, such as molten steel, at high temperatures erodes and degrades the inner surface of the refractory material and creates a high risk for molten steel leakage through the refractory wall and/or severe damage to the outer shell of the furnace. A major leak of molten steel through the gaps and cracks in the furnace walls may require at least 30 days of production disruption before the furnace can be restored to operating mode because it needs to be cooled down, repaired, and fired up again. Furthermore, a leak of molten steel may cause significant damage to the equipment around the furnace and, most importantly, put at risk the health and life of workers. For these reasons, in most cases furnace overhauls are conducted at a substantially earlier time than needed. This leads to significant costs for manufacturers in terms of their initial investment and the reduced production capacity over the operational life of the furnace.

Accordingly, it is critical for furnace operators to efficiently plan maintenance and monitor refractory material degradation of the furnace walls to extend the operational life of the furnace and plan required outages of the furnace when it is really necessary. The lifetime of a furnace is affected by a number of factors, including the operational age, the average temperature of operation, the heating and cooling temperature rates, the range of temperatures of operation, the number of cycles of operation, and the type and quality of the refractory material as well as the load and type of the molten material and additives used in the furnace. Each of these factors is subject to uncertainties that make it difficult to create accurate estimates of the expected lifetime of a furnace and when to perform the corresponding maintenance tasks.

Currently, there is no well-established method and apparatus for deterministically and effectively measuring the thickness and erosion profile of the internal walls or measuring the level or rate of penetration of molten material into the surrounding refractory material of a furnace or ladle having a steel outer shell. This impairs the ability to accurately estimate both the operational life and the maintenance plan of a vast number of furnaces and ladles. As a result, manufacturers may experience an unexpected leakage of molten material through the furnace wall, a severe damage to the outer shell of the furnace, or the need to conservatively shut down the furnace for re-build in order to reduce the likelihood of any potential leakage or severe damage, based on the manufacturer's experience of the expected lifetime of the furnace.

Another important issue is that the material used to build the refractory chamber of the furnace may have internal flaws not visible by surface inspection. This could translate into a shorter life of the furnace and pose serious risks during furnace operation. Accordingly, a common practice used by furnace operators to minimize the impact of a furnace breakdown and extend the operational life of the furnace is to build a grating structure to surround the external furnace refractory walls. Typically this grating consists of a set of elements, such as plates or bars made of steel or a material having a relatively high electrical conductivity, which are disposed substantially parallel and perpendicular to each other to form a grid.

Grating provides structural support not only to degrading refractory walls, but also to additional refractory installed in the furnace as a preventative or corrective maintenance measure. In addition, by absorbing and dissipating heat, grating contributes to cool down the refractory material. However, the grating spacing between adjacent elements can be as small as a few centimeters, which results in a difficulty in having a direct access, required by most sensors using radio frequency signals, to the furnace wall or an obstruction of the signals for sensors physically unable to fit within the grating spacing dimensions. Therefore, the impairment of an effective integration of a sensor, such as an antenna, and an existing or to be installed grating surrounding the refractory material of a furnace may translate into the inability to estimate the remaining operational life and the maintenance plan of the furnace or ladle.

Thus, there remains a need in the art for methods and apparatuses capable of remotely evaluating the status of refractory materials forming part of a furnace or ladle, through measurements of propagating RF signals, that avoid the problems of prior art methods and apparatuses.

SUMMARY OF THE INVENTION

An apparatus and method to evaluate and monitor the status of a refractory material forming part of a metallurgical vessel, such as a refractory furnace or a ladle, wherein an external structure at least partly surrounding the refractory material impairs the propagation of radiofrequency signals, is disclosed herein. One or more aspects of exemplary embodiments provide advantages while avoiding disadvantages of the prior art. The apparatus and method are operative to identify flaws and determine the erosion profile and thickness of refractory material and the level or rate of penetration of molten material into the refractory material, using radiofrequency signals. The apparatus comprises an antenna embedded in the refractory material or positioned inside the chamber of the vessel designed to collect data associated with the propagation of radiofrequency signals transmitted by the antenna into the refractory material. Moreover, signal processing techniques allow determining the status of the internal wall of the vessel due to operational wear, age, and presence of flaws, cracks, corrosion, and erosion to improve the operational life and maintenance of the vessel.

The external structure at least partly surrounding the refractory material of the vessel may be part of the vessel, as is typically the case for metallurgical ladles and certain furnaces, may be added on, such as a grating structure to provide additional mechanical support to an existing furnace, or may simply be a nearby structure impairing the access for properly setting up the transmission of an RF signal from outside the vessel into the refractory material. In addition, within the context of the present invention, a vessel may include a furnace or a ladle, and the terms furnace or ladle are used indistinctively as the invention applies to either one or both.

The antenna transmits an RF signal into an area of interest of the material to be evaluated. After the RF signal impinges upon such area, it is scattered and at least partly reflected by and at least partly transmitted through remote discontinuities. Any voids, flaws, the presence of a different material inside of the material to be evaluated, and any interface between two different materials, including air, may represent a remote discontinuity. The scattered RF signal is received by the same or a separate antenna and then is measured, recorded, processed by a computer-based processor, and timed using as reference the transmitted RF signal or the RF signal scattered from a known location of a discontinuity, such as the interface between the antenna and the surface of the material to be evaluated, as originally installed.

The computer-based processor has an executable computer code configured to measure the received scattered RF signal to produce either time domain data or frequency domain data that is transformed to time domain data and calibrate the time domain data to distance domain data. In particular, where the magnitude of the clutter is below the magnitude of the RF signal scattered from a remote discontinuity of the material under evaluation, the computer-based processor identifies a peak level of magnitude associated with this discontinuity and determines the distance from such discontinuity to the location associated with the reference RF signal. One or more evaluations over an area of interest of the material under evaluation may provide the thickness of the material and the location of certain flaws or extraneous elements inside the material. Moreover, time domain-based and/or frequency domain-based signal processing techniques or a combination of both may be used to determine and visualize the status of the evaluated area of interest.

In the present invention, the antenna is preferably embedded in the refractory material, more preferably using one or more casted refractory bricks, such that the antenna fits into the refractory material without having gaps between the antenna radiating edges and the refractory material. However, this is only possible to implement during the initial construction or during major repairs of the vessel. Alternatively, another configuration of the present invention comprises an antenna positioned inside the vessel's chamber. As a result, the refractory material of existing vessels can be evaluated as well. In addition, different attachment mechanisms might be incorporated into the antenna to physically position the antenna inside the vessel's chamber.

The method to evaluate the status and measure the erosion profile and thickness of different materials, including a refractory material forming part of a metallurgical vessel, and the level or rate of penetration of molten material into the refractory material, includes the step of setting up at least one antenna embedded in such material or positioned inside the chamber of the vessel. The method further includes the steps of transmitting at least one RF signal into an area of interest of the material under evaluation and receiving at least one RF signal after having impinged in such area. The method also includes measuring, recording, transferring, and processing the amplitude and phase of the received at least one RF signal for determining a status of the material under evaluation, based on the results of the processed data.

By embedding at least part of the apparatus, such as the antenna, into the refractory material or positioning the antenna inside the chamber of a metallurgical vessel, the apparatus and method are able to identify flaws and measure the erosion profile of the internal surface of such material and the penetration of molten material into the refractory material. Accordingly, the estimation of the remaining operational life of the vessel becomes more accurate, which in practice may represent extending the life of the vessel. This results in more effective and accurate scheduling to better manage the costly processes of metallurgical vessels repairs, decommissioning, or replacement along with a significant reduction of the level of risk of an operational break or leakage of molten material or severe damage to the vessel metal outer shell. Thus, the apparatus and method allow a more effective evaluation, monitoring, diagnosing, or tracking of one or more conditions, which may extend the operational life and improve the maintenance scheduling of costly and potentially risky assets, such as a metallurgical vessel.

BRIEF DESCRIPTION OF THE DRAWINGS

The numerous advantages of the present invention may be better understood by those skilled in the art by reference to the accompanying drawings in which:

FIGS. 3A to 3C show various aspects of an apparatus used for evaluating a status of a material, which is part of a furnace or ladle, in accordance with further aspects of an embodiment.

DETAILED DESCRIPTION OF THE INVENTION

The following description is of particular embodiments of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1A:
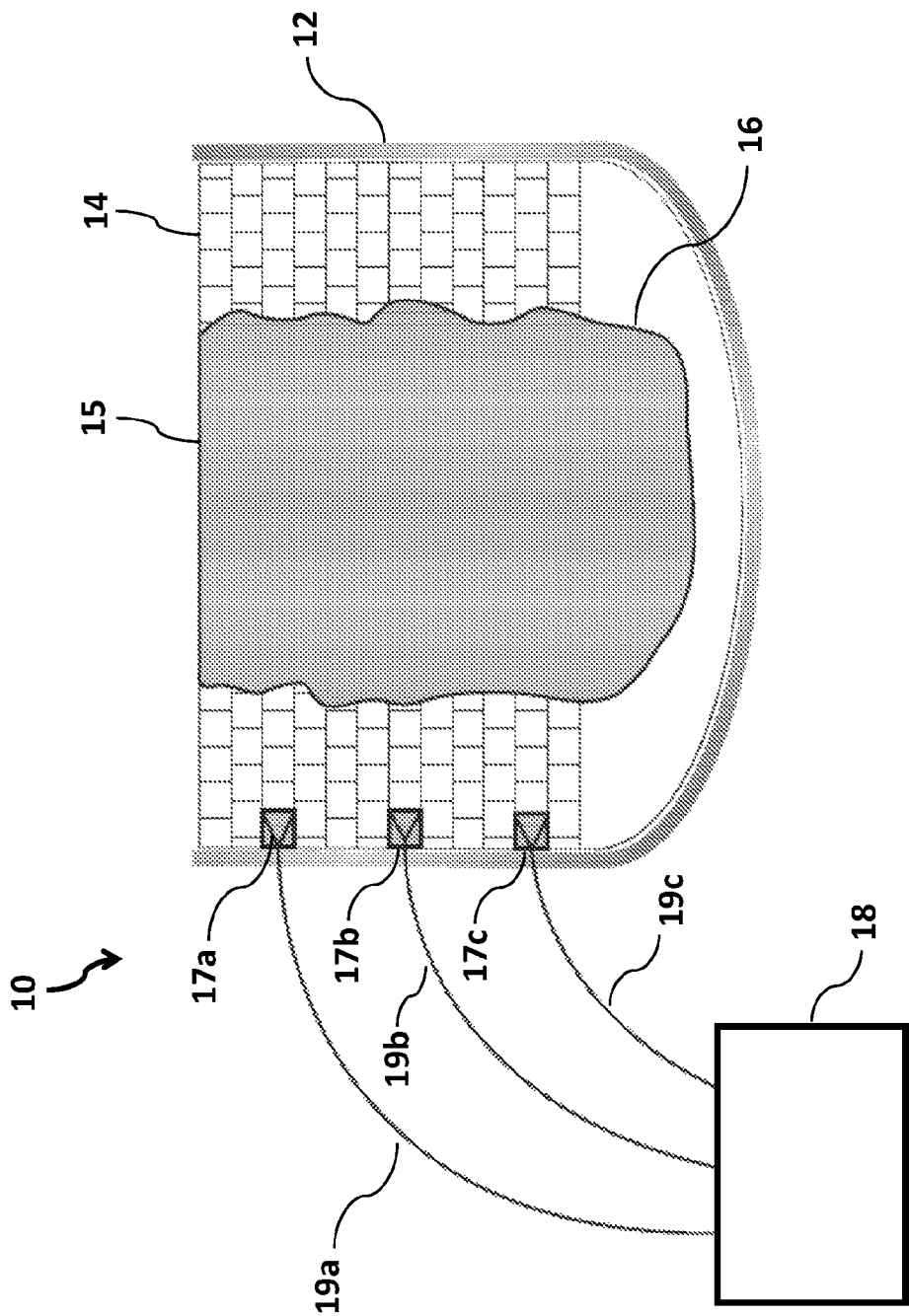
FIGS. 1A to 1C show various aspects of an apparatus used for evaluating a status of a material, which is part of a furnace or ladle, in accordance with certain aspects of an embodiment.
Figure 1B:
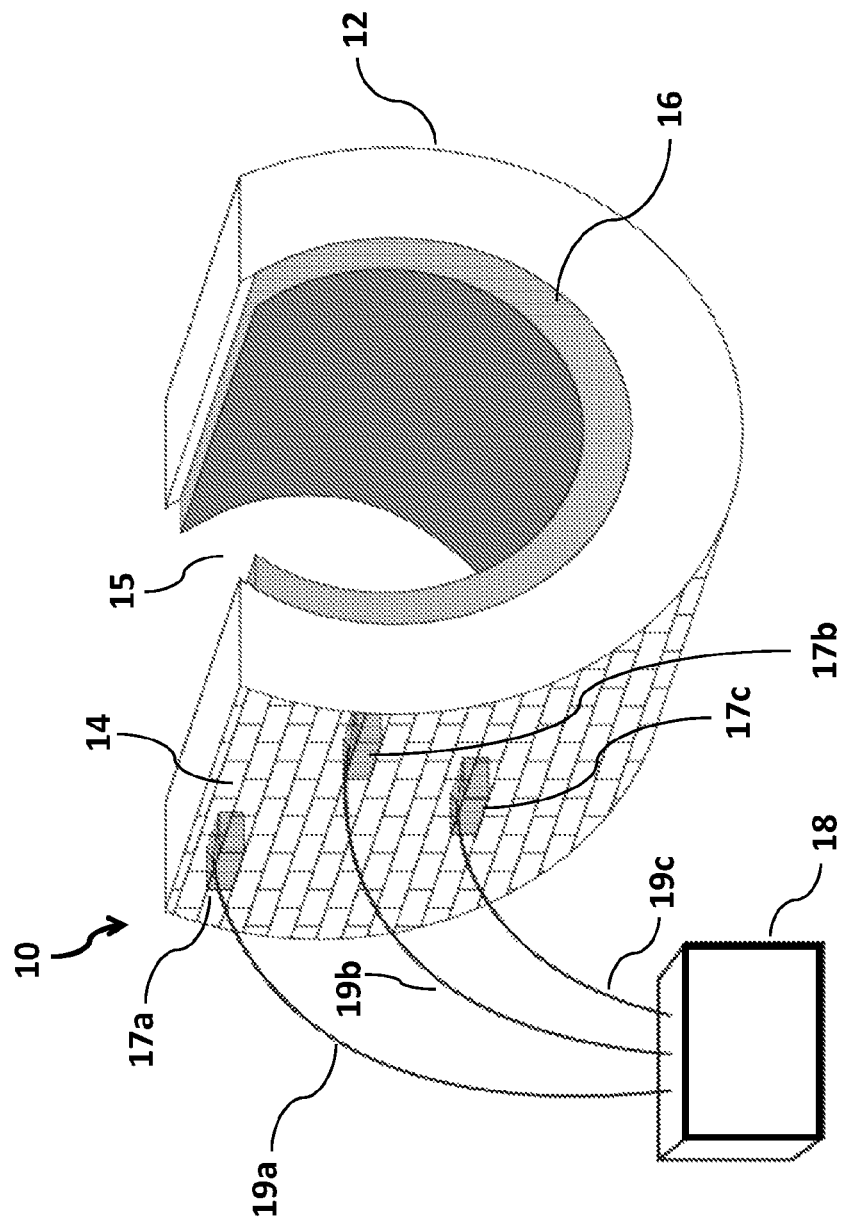
Figure 1C:
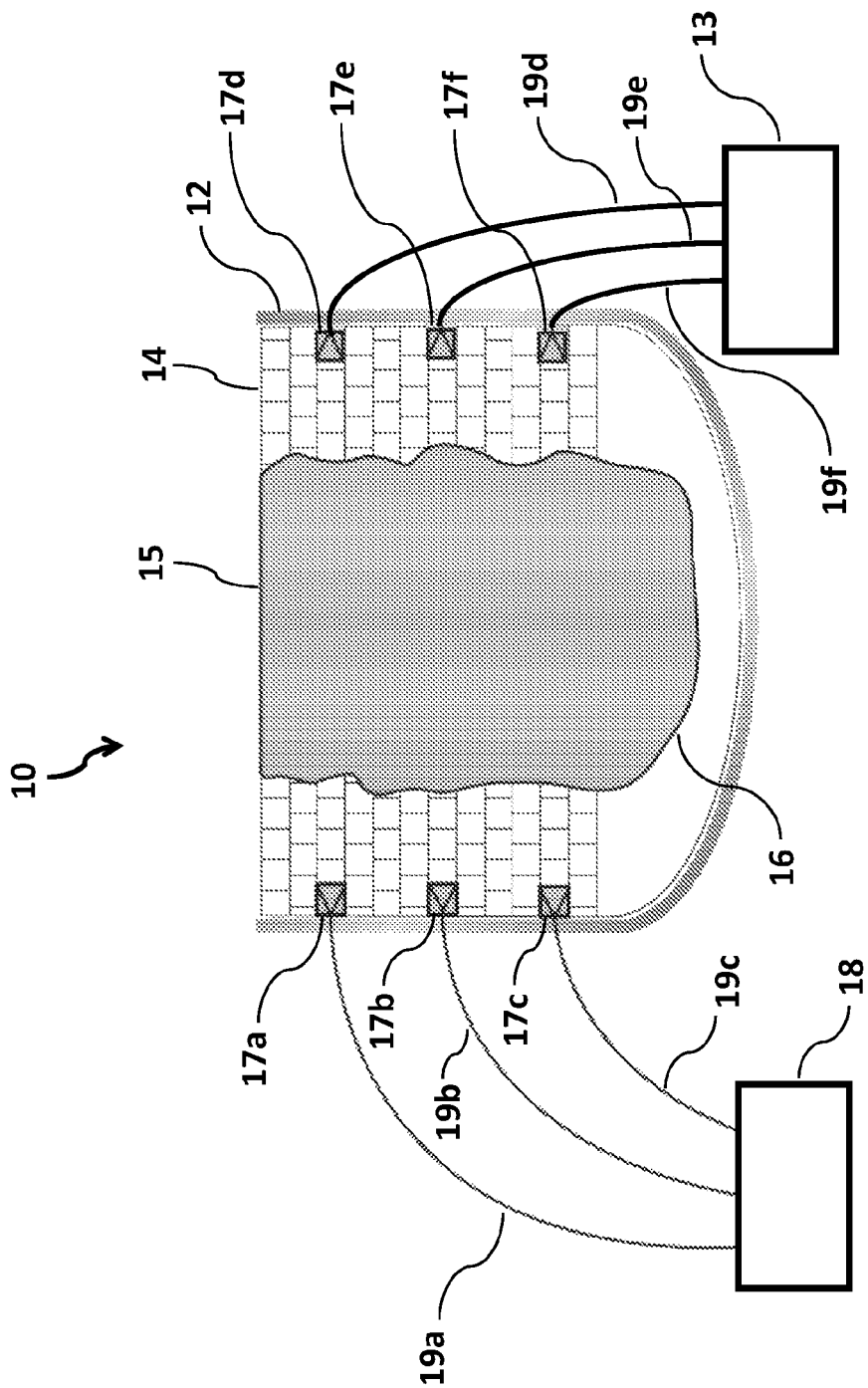

In accordance with certain aspects of an embodiment of the invention, FIGS. 1A to 1C show various aspects of an apparatus 10 used for evaluating a status of a furnace 12. Furnace 12 has a steel outer shell in this example. More specifically, apparatus 10 evaluates a status of refractory material 14, which typically at least partly surrounds a chamber 15 of a furnace 12. In other words, refractory material 14 is disposed in one or more layers between chamber 15, wherein melting of a material, such as steel, takes place, and the bottom and side external walls of furnace 12, including the outer steel shell. Typically the various layers of refractory material 14 are formed using bricks disposed side-by-side from bottom to top of furnace 12. Accordingly, refractory material 14 forms one or more walls surrounding chamber 15 of ladle or furnace 12, wherein a remote surface of an internal wall of refractory material 14 refers to the area of such wall or surface adjacent to chamber 15 of furnace 12. Likewise, an external wall of refractory material 14 is defined by the wall of refractory material 14 disposed the farthest away from chamber 15 of furnace 12. In addition, one or more sets of antennas comprising at least one antenna may be embedded within refractory material 14. Each of these sets of antennas may be controlled by a secondary computer-based processor, wherein a primary computer-based processor controls all of the secondary computer-based processors.

In this particular configuration, apparatus 10 comprises a set of three antennas 17a, 17b, and 17c, embedded within refractory material 14. Preferably, antennas 17a, 17b, 17c are designed and physically configured to operate embedded in one of the layers of refractory material 14. As a result, antennas 17a, 17b, 17c are inherently impedance matched to refractory material 14 and no additional impedance matching efforts are required. More preferably, antennas 17a, 17b, 17c are embedded in refractory material 14 and positioned such that a transmit signal from antennas 17a, 17b, 17c propagates through refractory material 14 to reach most of a contour 16, which defines an interface between refractory material 14 and chamber 15. Most preferably, each of antennas 17a, 17b, 17c is embedded in one or more casted bricks of refractory material 14. Ideally, during the design of the furnace the proper location of antennas 17a, 17b, 17c is defined and a matrix of each of antennas 17a, 17b, 17c is built to be casted with a set of castable refractory bricks that will be part of the internal wall of refractory material 14. Accordingly, antennas 17a, 17b, 17c will be installed at the predefined locations during furnace construction. Alternatively, a set of casted refractory bricks in which antennas 17a, 17b, 17c have been embedded may be used to replace regular, uncasted, refractory bricks at the predefined locations during furnace maintenance.

Moreover, since in this configuration the antennas are designed to be casted into the refractory bricks, such that the antenna fits into the refractory material without having gaps between the antenna radiating edges and the refractory material, there is no need for special efforts to match the impedance of the antennas to that of the refractory material, which is typically the case where the antennas are not casted and instead externally set up against refractory material.

Apparatus 10 further comprises a transceiver 18 capable of transmitting and receiving RF signals and a set of cables 19a, 19b, and 19c to couple transceiver 18 to antennas 17a, 17b, and 17c, respectively. Apparatus 10 further comprises a data storage device to store data and a single computer-based processor, both of which can be integrated with transceiver 18. The stored data may be retrievable by using a portable memory drive, a cable, or other electronic means known to those skilled in the art. Moreover, at least partly, transceiver 18 may be integrated with one or more of antennas 17a, 17b, and 17c. Accordingly, based on the level of integration of transceiver 18 and antennas 17a, 17b, and 17c, the refractory bricks and outer steel shell of furnace 12 are physically configured to allow the routing of set of cables 19a, 19b, and 19c or other control, power, or communication lines from antennas 17a, 17b, and 17c or at least part of transceiver 18 to outside of vessel 12. These physical configurations may include grooves, holes, indentations, cuts, ducts, and passages. In addition, set of cables 19a, 19b, and 19c must be capable of withstanding high temperatures of at least 500° C. It is noted that components of transceiver 18, and particularly the storage device and the computer-based processor, have not been shown as these components are not critical to the explanation of this embodiment.

During an evaluation of a status of refractory material 14, and more specifically a status of contour 16 of refractory material 14, the RF signals transmitted by transceiver 18 through antennas 17a, 17b, 17c that reach contour 16 are partly reflected. This reflection is due to the media discontinuity faced by the propagating RF signals at the interface between refractory material 14 and the material inside chamber 15 of furnace 12. Preferably antennas 17a, 17b, 17c are positioned such that a transmit signal from antennas 17a, 17b, 17c impinges substantially perpendicular to contour 16 in an area where contour 16 is contiguous to the molten material inside chamber 15 of furnace 12. More preferably, antennas 17a, 17b, 17c are physically configured to reduce a plurality of reflections and probe ringing of a radiofrequency signal transmitted or received by antennas 17a, 17b, 17c, by a sufficient extent so as to enable detection of such radiofrequency signal after being scattered from a remote discontinuity of refractory material 14. Most preferably, antennas 17a, 17b, 17c are physically configured and positioned such that a transmit signal from antennas 17a, 17b, 17c minimally reaches the outer steel shell of vessel 12 to minimize any effects of signals received by transceiver 18 after being reflected by the outer steel shell of vessel 12.

Typically chamber 15 contains steel or air (when chamber 15 is empty). The RF signals reflected at contour 16 are received by antennas 17a, 17b, 17c and sent to transceiver 18 for further treatment, storing, and processing. Transceiver 18 measures the amplitude and phase of the received signals over one or more frequency bands in the 0.5 GHz to 70 GHz range. Moreover upon processing of these signals using one or more signal processing methods in the frequency and/or time domain, apparatus 10 is capable of determining a shape of contour 16 and a corresponding thickness of refractory material 14 along different points of contour 16. In addition, apparatus 10 is capable of determining the level and rate of penetration of the molten material in chamber 15 into refractory material 14.

Alternatively, antennas 17a, 17b, 17c might be attached to refractory material 14 of vessel 12 instead of being embedded in refractory material 14. In any case, each of antennas 17a, 17b, 17c is in physical contact with refractory material 14, and preferably comprises a pyramidal horn antenna having a rectangular cross-section, further comprising a first flared plate having a planar section and two flared sections along opposite side edges of such planar section of the first flared plate, and a second flared plate positioned opposite the first flared plate, wherein such second flared plate comprises a planar section and two flared sections along opposite side edges of such planar section of such second flared plate. In particular, the thickness of at least one of such first flared plate and second flared plate might be variable, and preferably a thickness-to-length ratio of at least one of such first flared plate and second flared plate is within the range of 15% to 85%. In this configuration, more preferably, each of antennas 17a, 17b, and 17c further comprises a dielectric material disposed in at least a portion of a volumetric region, between first flared plate and second flared plate, which extends beyond the two flared sections along the opposite side edges of the first flared plate and the second flared plate. Most preferably the dielectric material has a dielectric permittivity that matches the dielectric permittivity of refractory material 14 to smooth out the media discontinuity between such dielectric material and refractory material 14. Alternatively, the refractory material itself is used as the dielectric material.

Those skilled in the art will realize that different types of antennas other than a horn antenna and/or having or not having smooth rolled edges may be used in apparatus 10. More specifically, horn antennas having four flared plates; non-pyramidal horn antennas, such as conical or the like; or horn antennas with non-rectangular cross-section, such as elliptical, may be used. Likewise, those of ordinary skill in the art will realize that apparatus 10 may further comprise various arrangements of RF components, such as filters, impedance matching networks, amplifiers, non-coherent detectors and other test instrumentation used in different ways to implement the measurement of transmitted and reflected RF signals and perform the functions of transceiver 18 and the computer-based processor as are known in the prior art. Furthermore, those skilled in the art will realize that cables 19a, 19b, and 19c can be replaced with a wireless system to couple antennas 17a, 17b, and 17c to transceiver 18.

In particular, FIG. 1A shows a side view of a transversal cut of furnace 12, depicting apparatus 10, wherein antennas 17a, 17b, 17c are embedded in refractory material 14 forming part of a single wall of furnace 12. Likewise, FIG. 1B shows a bottom view of a transversal cut of furnace 12, depicting apparatus 10, wherein antennas 17a, 17b, 17c are embedded in refractory material 14 forming part of a single wall of furnace 12. More specifically, antennas 17a, 17b, 17c are positioned over refractory material 14 in an arrangement that increases the potential area of evaluation of contour 16 at the interface between refractory material 14 and chamber 15.

In reference to FIG. 1C, a side view of a transversal cut of furnace 12 is shown, depicting apparatus 10, wherein antennas 17a, 17b, 17c are embedded in refractory material 14 forming part of a single wall of furnace 12 and antennas 17d, 17e, and 17f are embedded in refractory material 14 as well forming part of a single wall of furnace 12, such that antennas 17d, 17e, 17f are opposite to 17a, 17b, 17c. In this configuration, apparatus 10 further comprises a second transceiver 13 capable of transmitting and receiving RF signals and a set of cables 19d, 19e, and 19f to couple transceiver 13 to antennas 17d, 17e, and 17f, respectively. Apparatus 10 even further comprises a second data storage device and a second computer-based processor, both of which can be integrated with transceiver 13. Moreover, at least partly, transceiver 13 may be integrated with one or more of antennas 17d, 17e, and 17f. It is noted that components of transceiver 13, namely the storage device and the computer-based processor, have not been shown as these components are not critical to the explanation of this embodiment. Those skilled in the art will realize that antennas 17d, 17e, 17f can be connected through cables 19d, 19e, 19f to transceiver 18, such that a single transceiver is used for all six antennas 17a to 17f.

Preferably antennas 17a, 17b, 17c and antennas 17d, 17e, 17f face each other, respectively. More preferably, an RF signal transmitted by antennas 17a, 17b, 17c is received by at least one of antennas 17d, 17e, 17f. Most preferably, an evaluation of a status of refractory material 14 using this specific configuration, in reference to FIG. 1C, is performed while chamber 15 of furnace 12 is at least partly empty, such that a signal transmitted through chamber 15 is less attenuated as compared to the case in which chamber 15 is non-empty. This particular configuration may provide additional information about the transmitted signal from one or more of antennas 17a, 17b, 17c to one or more of antennas 17d, 17e, 17f, as it goes through contour 16 at least at two different areas. A first area of contour 16 at the interface between refractory material 14 and chamber 15 is closer to one or more of the transmit antennas 17a, 17b, 17c, and a second area of contour 16 at the interface between refractory material 14 and chamber 15 is closer to one or more of the receive antennas 17d, 17e, 17f. Those skilled in the art will realize that each of the antennas 17a to 17f can be used as a transmit or receive antenna. The key issue is to have at least one of the transmit antennas facing at least one of the receive antennas.

Figure 2A:
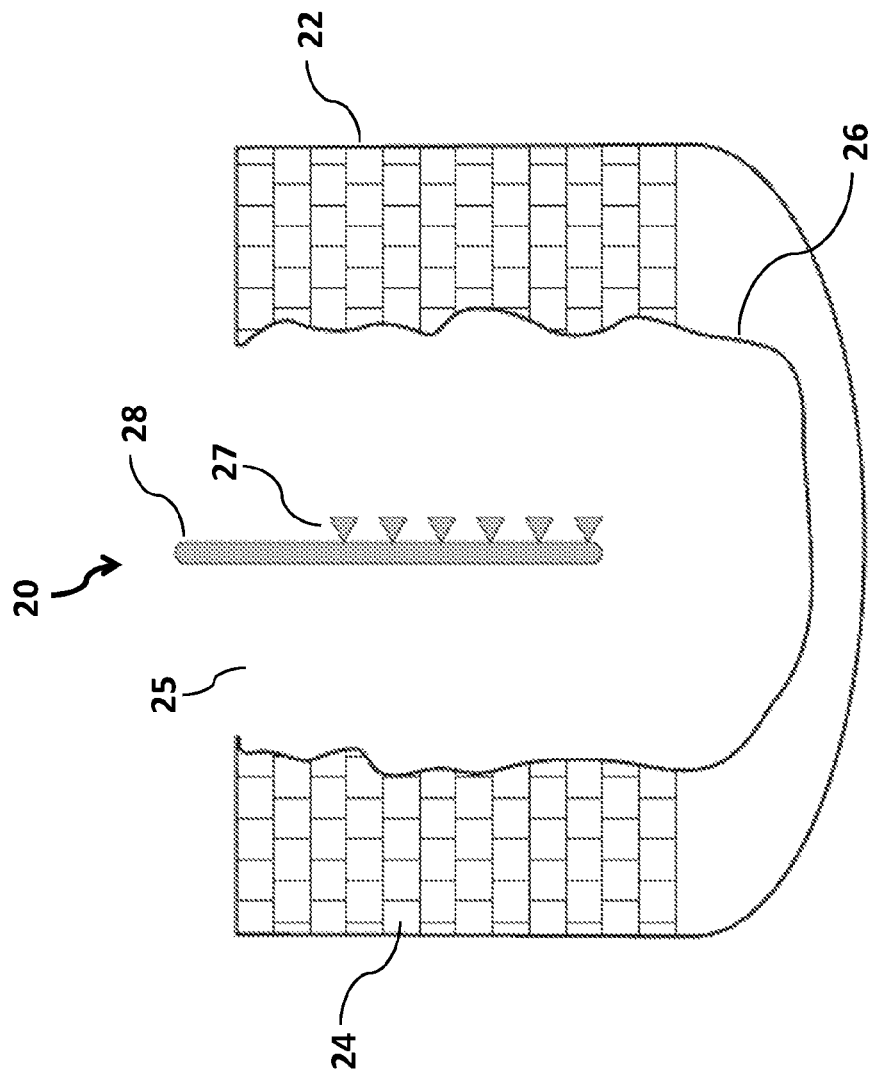
FIGS. 2A to 2C show various aspects of an apparatus used for evaluating a status of a material, which is part of a furnace or ladle, in accordance with further aspects of an embodiment.
Figure 2B:
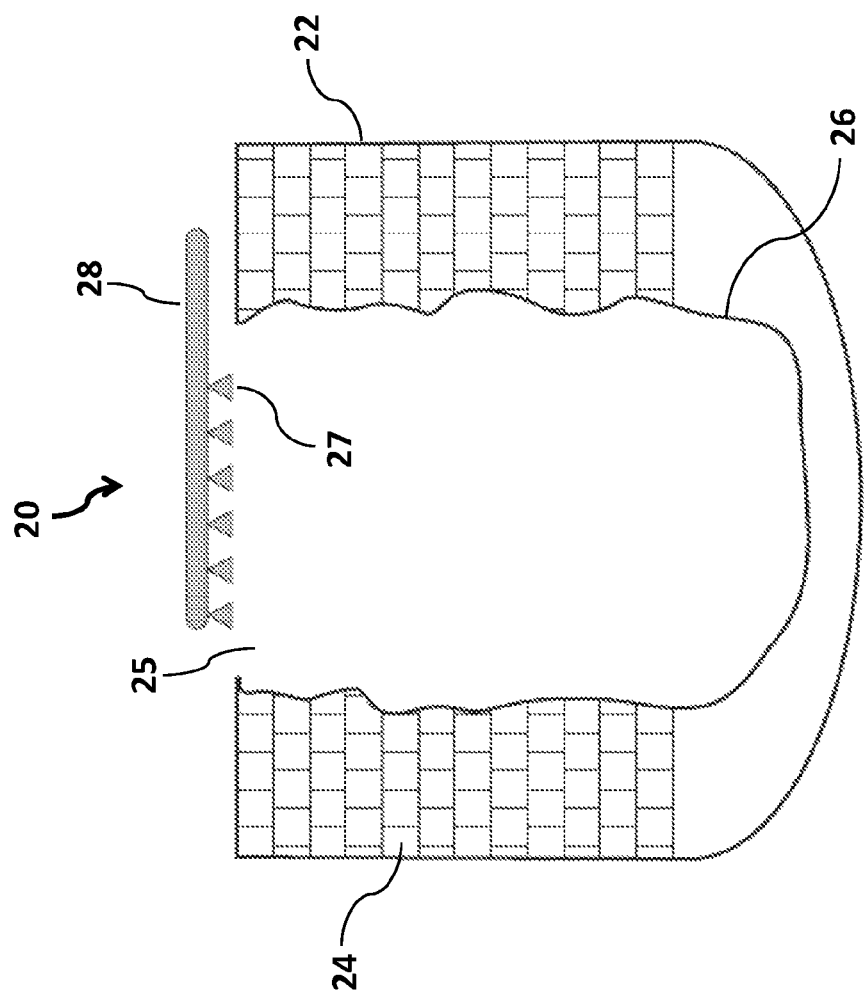
Figure 2C:
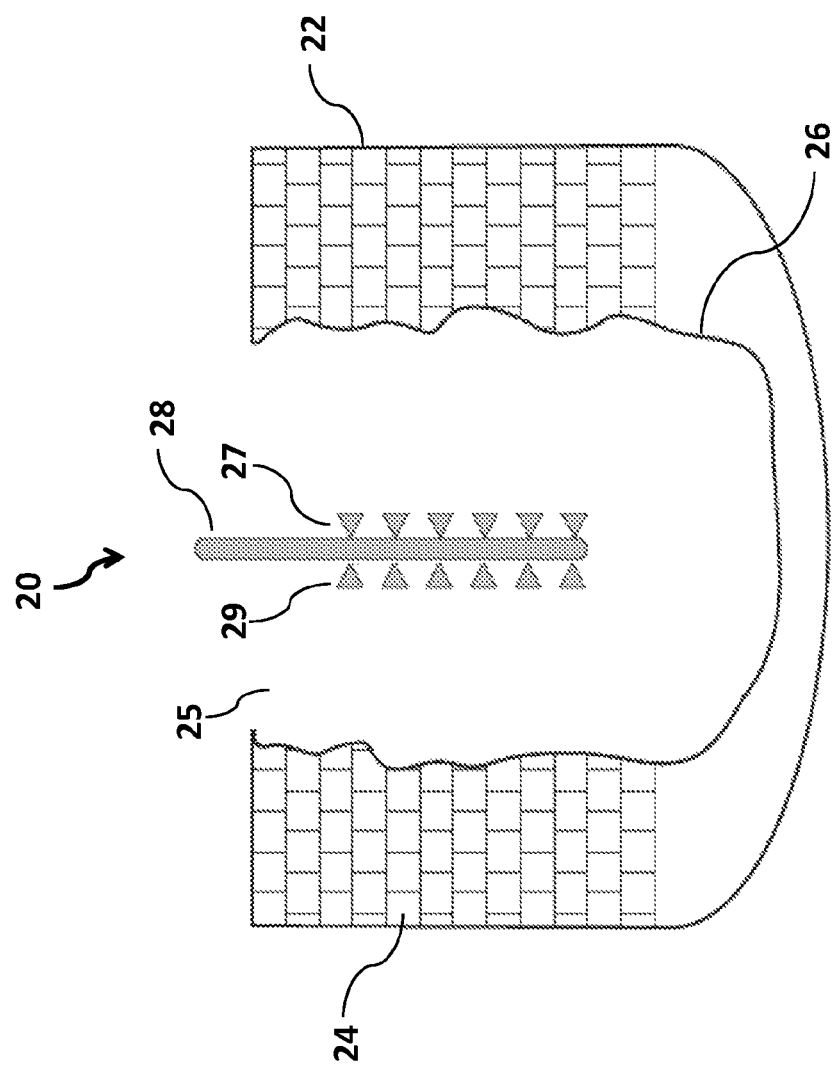

FIGS. 2A to 2C show various aspects of an apparatus 20 used for evaluating a status of a cylindrical furnace 22 in accordance with further aspects of an embodiment. More specifically, apparatus 20 evaluates a status of refractory material 24, which typically at least partly surrounds a chamber 25 of furnace 22. In other words, refractory material 24 is disposed in one or more layers between chamber 25, wherein melting of a material, such as steel, takes place, and the bottom and side walls of ladle 22. Typically the various layers of refractory material 24 are formed using bricks disposed side-by-side from bottom to top of ladle 22. Accordingly, refractory material 24 forms one or more walls surrounding chamber 25 of ladle 22.

In this particular configuration, apparatus 20 comprises one or more antennas forming an antenna array 27, which is positioned inside chamber 25, while ladle 22 is not in operation and is fully or partially empty. Preferably, antenna array 27 is positioned such that a transmit signal from antenna array 27 propagates inside chamber 25 to reach most of a contour 26, which defines an interface between refractory material 24 and chamber 25. More preferably antenna array 27 is positioned such that a transmit signal from antenna array 27 impinges substantially perpendicular to contour 26. Most preferably, antenna array 27 is mounted on a mechanical structure 28 that can support and adjust the positioning of antenna array 27 inside chamber 25 either during furnace operation or while the furnace is not operating.

Moreover, apparatus 20 may further comprise a controller, mountable on structure 28, which can be programmed to automatically position antenna array 27 by means of one or more motorized mechanisms. In a preferred configuration, structure 28 may be rotated along an axis substantially parallel to the area of contour 36 under evaluation or set up at various positions such that antenna array 27 is capable of receiving RF signals reflected from all the area defined by contour 26. In addition, apparatus 20 may further comprise software used to automatically control the positioning of structure 28 for performing the corresponding evaluation of a status of a material, record and store the measured data, or guide step-by-step at least a part of the evaluation process.

Apparatus 20 further comprises a transceiver capable of transmitting and receiving RF signals and a set of cables to couple antenna array 27 to such transceiver. Apparatus 20 further comprises a data storage device and a computer-based processor, both of which can be integrated with such transceiver. Moreover, at least partly, such transceiver may be integrated with antenna array 27. It is noted that the transceiver, storage device, computer-based processor, controller, and motors have not been shown as these components are not critical to the explanation of this embodiment. Furthermore, if applicable, structure 28 may provide a supporting mechanism for routing cables or mounting the transceiver, storage device, computer-based processor, controller, motors, and sensors such as a laser, a LIDAR, or an ultrasound sensor.

During an evaluation of a status of refractory material 24, and more specifically, a status of contour 26 of refractory material 24, the RF signals transmitted by antenna array 27 that reach contour 26 are partly reflected. This reflection is due to the media discontinuity faced by the propagating RF signals at the interface between chamber 25 and refractory material 24. The RF signals reflected at contour 26 are received by antenna array 27 and sent to the transceiver for further treatment, storing, and processing, as described above for the case of apparatus 10, in reference to FIGS. 1A to 1C.

Alternatively, antenna array 27 might be attached to refractory material 24 of ladle 22, instead of being mounted on structure 28. In any case, each of the antennas of antenna array 27 preferably comprises a pyramidal horn antenna, as described above for the case of apparatus 10, in reference to FIGS. 1A to 1C. Those skilled in the art will realize that different types of antennas other than a horn antenna and/or having or not having smooth rolled edges may be used in apparatus 20. More specifically, horn antennas having four flared plates; non-pyramidal horn antennas, such as conical or the like; or horn antennas with non-rectangular cross-section, such as elliptical, may be used. Likewise, those of ordinary skill in the art will realize that apparatus 20 may further comprise various arrangements of RF components, such as filters, impedance matching networks, amplifiers, non-coherent detectors and other test instrumentation used in different ways to enable the measurement of transmitted and reflected RF signals and perform the functions of the transceiver and the computer-based processor as are known in the prior art.

In particular, FIG. 2A shows a side view of a transversal cut of ladle 22, depicting apparatus 20, wherein antenna array 27 is mounted on structure 28 and positioned substantially at the center of chamber 25, such that RF signals transmitted by antenna array 27 impinge substantially perpendicular to the area of contour 26 located at the side walls of chamber 25 of ladle 22. Likewise, FIG. 2B shows a side view of a transversal cut of ladle 22, depicting apparatus 20, wherein antenna array 27 is mounted on structure 28 and positioned substantially at the center of chamber 25, such that RF signals transmitted by antenna array 27 impinge substantially perpendicular to the area of contour 26 located at the bottom of chamber 25 of ladle 22.

In reference to FIG. 2C, a side view of a transversal cut of ladle 22 is shown, depicting apparatus 20, wherein a first antenna array 27 and a second antenna array 29 are mounted on structure 28 and positioned substantially at the center of chamber 25, such that RF signals transmitted by antenna array 27 impinge substantially perpendicular to the area of contour 26 located at the side walls of chamber 25 of ladle 22. In this configuration, apparatus 20 may not need to be rotated or be subject to less rotation as antenna arrays 27, 29 are capable of transmitting an RF signal into a larger area of contour 26 as compared to the case in which only antenna array 27 is used, in reference to FIG. 2A.

Figure 3A:
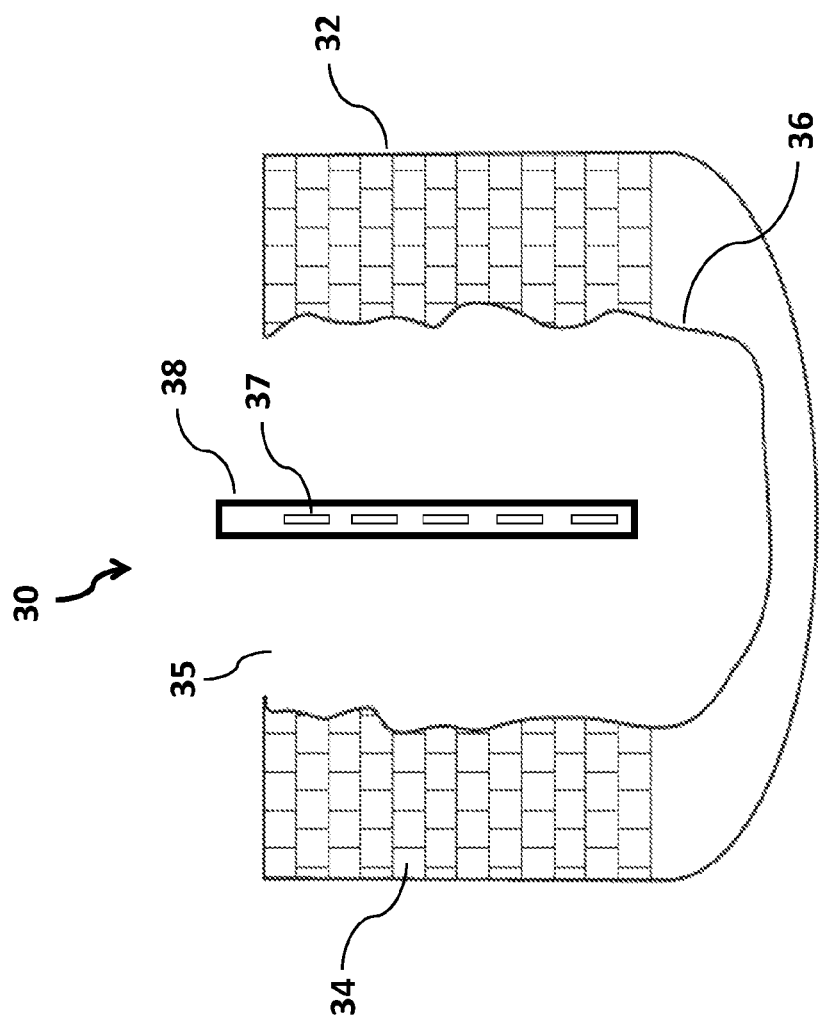
Figure 3B:
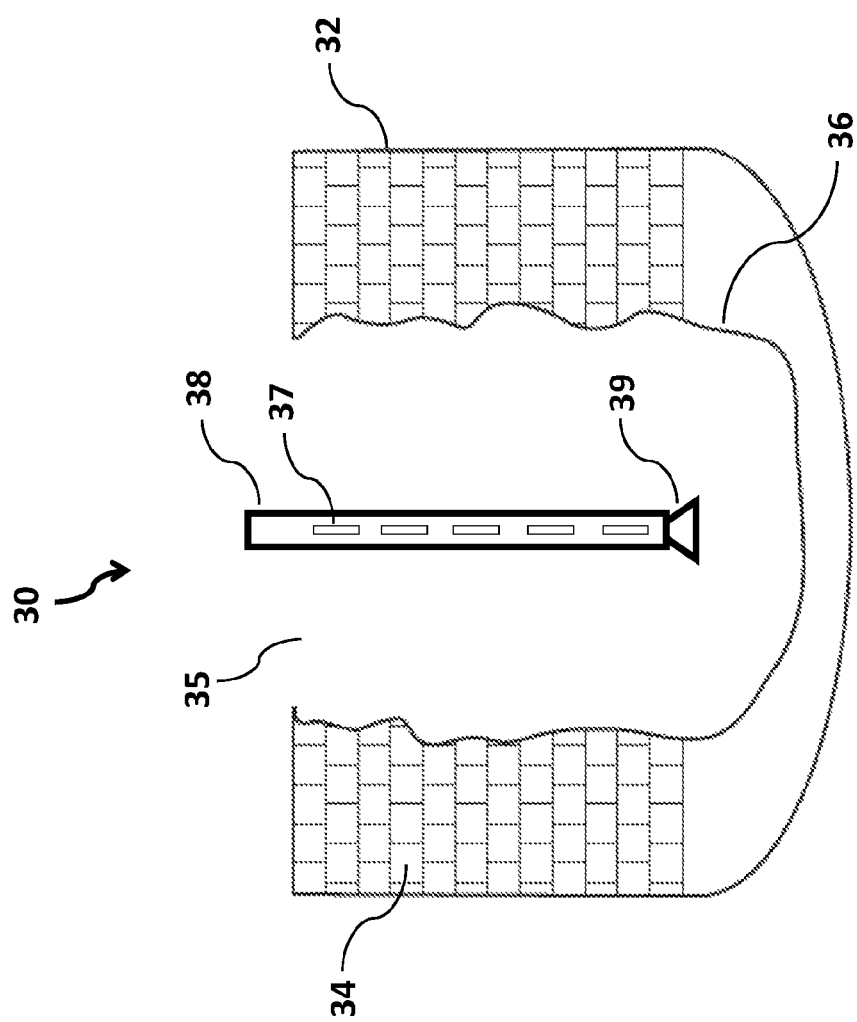
Figure 4:
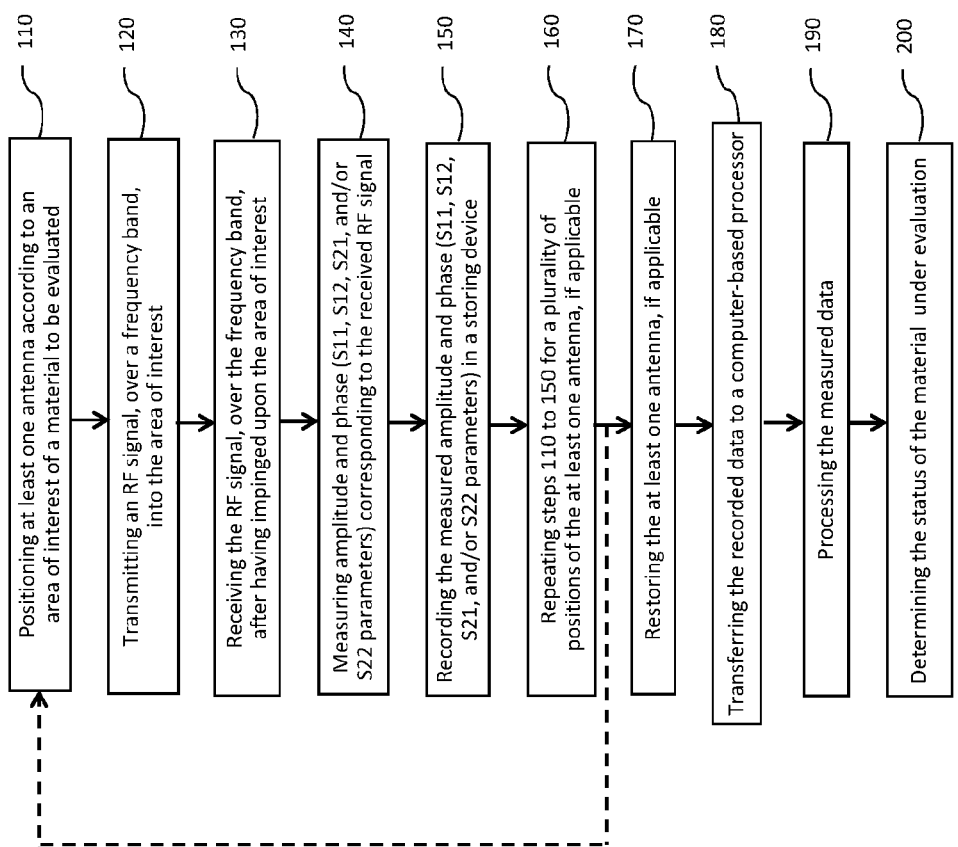
FIG. 4 shows a schematic view of a method for evaluating the status of a material in accordance with still further aspects of an embodiment.

FIGS. 3A to 3C show various aspects of an apparatus 30 used for evaluating a status of a cylindrical ladle 32 in accordance with still further aspects of an embodiment. More specifically, apparatus 30 evaluates a status of refractory material 34, which typically at least partly surrounds a chamber 35 of ladle 32. In other words, refractory material 34 is disposed in one or more layers between chamber 35, wherein melting of a material, such as steel, takes place, and the bottom and side walls of ladle 32. Typically the various layers of refractory material 34 are formed using bricks disposed side-by-side from bottom to top of ladle 32. Accordingly, refractory material 34 forms one or more walls surrounding chamber 35 of ladle 32.

In this particular configuration, apparatus 30 comprises one or more slot antennas forming a slot antenna array 37 along a waveguide 38 within which RF signals propagate. Slot antenna array 37 and waveguide 38 are positioned inside chamber 35, while ladle 32 is not in operation and is fully or partially empty. Preferably, slot antenna array 37 is positioned such that a transmit signal from slot antenna array 37 propagates inside chamber 25 to reach most of a contour 36, which defines an interface between refractory material 34 and chamber 35. More preferably slot antenna array 37 is positioned such that a transmit signal from slot antenna array 37 impinges substantially perpendicular to all areas of contour 36. Most preferably, waveguide 38 is part of a mechanical structure that can support and adjust the positioning of slot antenna array 37 inside chamber 35 either during furnace operation or while the furnace is not operating.

Moreover, apparatus 30 may further comprise a controller, attachable to waveguide 38, which can be programmed to automatically position slot antenna array 37 by means of one or more motorized mechanisms. In a preferred configuration, waveguide 38 may be rotated along an axis substantially parallel to the area of contour 36 under evaluation or set up at various positions such that slot antenna array 37 is capable of receiving RF signals reflected from all the area defined by contour 36. Preferably, waveguide 38 is an open ended waveguide to additionally transmit RF signals substantially perpendicular to the area of contour 36 located at the bottom of chamber 35 of ladle 32. In addition, apparatus 20 may further comprise software used to automatically control the positioning of structure 28 for performing the corresponding evaluation of a status of a material, record and store the measured data, or guide step-by-step at least a part of the evaluation process.

Apparatus 30 further comprises a transceiver capable of transmitting and receiving RF signals and a set of cables and/or adapters to couple waveguide 38 to such transceiver. Apparatus 30 even further comprises a data storage device and a computer-based processor, both of which can be integrated with such transceiver. Moreover, at least partly, such transceiver may be integrated with waveguide 38. It is noted that the transceiver, storage device, computer-based processor, controller, and motors have not been shown as these components are not critical to the explanation of this embodiment. Furthermore, if applicable, waveguide 38 may provide a supporting mechanism for routing cables or mounting the transceiver, storage device, computer-based processor, controller, motors, and sensors such as a laser, a LIDAR, or an ultrasound sensor.

During an evaluation of a status of refractory material 34, and more specifically, a status of contour 36 of refractory material 34, the RF signals transmitted by slot antenna array 37 that reach contour 36 are partly reflected. This reflection is due to the media discontinuity faced by the propagating RF signals at the interface between chamber 35 and refractory material 34. The RF signals reflected at contour 36 are received by slot antenna array 37 and sent through waveguide 38 to the transceiver for further treatment, storing, and processing, as described above for the case of apparatus 10, in reference to FIGS. 1A to 1C.

Alternatively, waveguide 38 might be attached to refractory material 34 of ladle 32. In any case, each of the antennas of slot antenna array 37 preferably comprises an opening on the side of waveguide 38 dimensioned to transmit and receive an RF signal, as well known in the prior art. Those skilled in the art will realize that different types of slot antennas, in terms of size and shapes may be used in apparatus 30. Likewise, those of ordinary skill in the art will realize that apparatus 30 may further comprise various arrangements of RF components, such as filters, impedance matching networks, amplifiers, non-coherent detectors and other test instrumentation used in different ways to enable the measurement of transmitted and reflected RF signals and perform the functions of the transceiver and the computer-based processor as are known in the prior art.

In particular, FIG. 3A shows a side view of a transversal cut of ladle 32, depicting apparatus 30, wherein slot antenna array 37 is mounted on waveguide 38, which is positioned substantially at the center of chamber 35, such that RF signals transmitted by slot antenna array 37 impinge substantially perpendicular to the area of contour 36 located at the side walls of chamber 35 of ladle 32. Preferably, waveguide 38 is an open ended waveguide to additionally be able to transmit RF signals substantially perpendicular to the area of contour 36 located at the bottom of chamber 35 of ladle 32.

Likewise, FIG. 3B shows a side view of a transversal cut of ladle 32, depicting apparatus 30, wherein slot antenna array 37 is mounted on waveguide 38 and positioned substantially at the center of chamber 35, such that RF signals transmitted by slot antenna array 37 impinge substantially perpendicular to the area of contour 36 located at the side walls of chamber 35 of ladle 32. In this particular configuration, waveguide 38 is used as a feeding mechanism of an antenna 39 located at the end of waveguide 38. Antenna 39 provides additional gain to RF signals transmitted and reflected by antenna 39. In addition, antenna 39 may transmit RF signals, which are substantially perpendicular to the area of contour 36 located at the bottom of chamber 35 of ladle 32. Preferably antenna 39 comprises a pyramidal horn antenna, as described above for the case of apparatus 10, in reference to FIGS. 1A to 1C. Those skilled in the art will realize that different types of antennas other than a horn antenna and/or having or not having smooth rolled edges may be used in apparatus 30. More specifically, horn antennas having four flared plates; non-pyramidal horn antennas, such as conical or the like; or horn antennas with non-rectangular cross-section, such as elliptical, may be used.

In reference to FIG. 3C, a side view of a transversal cut of ladle 32 is shown, depicting apparatus 30, wherein a first slot antenna array 37a, a second slot antenna array 37b, and a third slot antenna array 37c are mounted on waveguides 38a, 38b, and 38c, respectively. Waveguides 38a, 38b, and 38c are positioned substantially at the center of chamber 35, such that RF signals transmitted by slot antenna arrays 37a, 37b, 37c, impinge substantially perpendicular to the area of contour 36 located at the side walls of chamber 35 of ladle 32. Preferably, at least one of waveguides 38a, 38b, 38c is an open ended waveguide to additionally be able to transmit RF signals substantially perpendicular to the area of contour 36 located at the bottom of chamber 35 of ladle 32. More preferably, at least one of waveguides 38a, 38b, 38c is terminated in an antenna.

Each of the antennas in the various embodiments set forth above may operate in an elliptical polarization, including a generally linear polarization or a generally circular polarization. Moreover, one or more antennas may operate in a transmit-only mode and one or more different antennas may operate in a receive-only mode, such that the system operates in a bi-static or a multi-static configuration. Alternatively, multiple antennas may operate in transmit-only, receive-only, or transmit-and-receive modes, such that the system operates in a multiple input, multiple output (MIMO) configuration. Furthermore, the transmission of the corresponding signals from these antennas may be conducted simultaneously or at different times and may use an electronic scanning mechanism. In addition, each of these antennas may include one or more materials having a variable conductivity, an RF absorber material, a metamaterial, a ferromagnetic material, or any combination thereof configured to improve the performance of at least one antenna or to reduce the electromagnetic coupling between at least one antenna and another antenna or a component of the structure supporting the at least one antenna or forming part of or being in the furnace.

Likewise, one or more signal processing methods in frequency and/or time domain may be used for determining the surface topology of the internal walls and/or the bottom of the refractory material in the chamber furnace. In particular, two-dimensional and three-dimensional images of the results of the evaluation of a status of a material may be generated by using one or more signal processing techniques, including back projection, delay and sum, synthetic aperture radar imaging, back propagation, inverse scattering, and super-resolution, either with or without the application of differential imaging, from the data collected. Furthermore, the application of signal processing techniques may be used to calculate a figure of merit of any of the antennas described above, including but not limited to electromagnetic fields, currents, electromagnetic radiation gain, input impedance, and polarization, to support or guide the measurement setup and data collection process.

The foregoing configurations have been described herein in an illustrative manner, and it is to be understood that the terminology used is intended to be in the nature of words of description rather than of limitation. Any configuration herein disclosed may include one or more aspects of the other configurations. The exemplary embodiments set forth herein are described to explain some of the principles of the present invention so that others skilled in the art may practice the invention.

Method

A method for evaluating a status of a material in accordance with further aspects of an embodiment of the invention will now be described. The method is operative to measure at least one RF signal using a transceiver and at least one antenna properly positioned to transmit and/or receive such RF signal impinging upon and/or reflecting from a predefined area of a material to be evaluated, according to the following:

1. At step 110, positioning at least one antenna capable of transmitting and receiving RF signals, over a frequency band, to and from an area surrounding the antenna, such that these signals impinge upon and reflect from a predefined area of interest of a material to be evaluated. In particular, for a furnace or ladle, the at least one antenna is preferably positioned either attached to the internal wall of or permanently embedded in the refractory material surrounding the chamber of the furnace or ladle, such that the RF signals are transmitted into such area of interest of the internal walls and/or the bottom of the chamber. Alternatively the at least one antenna may be installed in a structure, which can be inserted inside the chamber of such ladle or furnace. Preferably a plurality of antennas are properly positioned to perform a more accurate and efficient evaluation of a larger portion of the predefined area of interest of the material to be evaluated.

2. At step 120, transmitting at least one RF signal, using a transmitter and the at least one antenna, as described in step 110, such that the at least one RF signal impinges upon the area of interest of the material under evaluation. Particularly, for a ladle, the at least one RF signal should be transmitted into the internal walls and/or the bottom of the ladle chamber. Preferably multiple RF signals are transmitted using a plurality of antennas.

3. At step 130, receiving at least one RF signal, using a receiver and the at least one antenna, as described in step 110, after the at least one transmitted RF signal has impinged upon the area of interest of the material under evaluation. Alternatively, the at least one RF signal has been transmitted by a first antenna and received by a second antenna. Particularly, for a ladle, the at least one RF signal should have been impinged upon the internal walls and/or the bottom of the ladle chamber. Preferably multiple RF signals are received using a plurality of antennas.

4. At step 140, measuring the amplitude and phase of the received at least one RF signal after having impinged upon the area of interest of the material under evaluation. This may correspond to measuring the S11 and/or S22 scattering parameters of a received RF signal reflected from the area of interest of the material under evaluation. Alternatively, this may correspond to measuring the S12 and/or S21 scattering parameters involving an RF signal transmitted by a first antenna and received by a second antenna after having impinged upon the area of interest of the material under evaluation.

5. Next, at step 150, recording the measured amplitude and phase of the at least one RF signal received after having impinged upon the area of interest of the material under evaluation (S11, S22, S12, and/or S21 scattering parameters), as described in step 140, in a storing device.

6. Next, at step 160, if applicable, repeating steps 110 to 150 for a plurality of positions of the at least one transmitting and receiving antenna, or alternatively the at least one transmitting antenna and the at least one receiving antenna, to complete the evaluation of the predefined area of interest of the material under evaluation. In particular, for a ladle, the plurality of positions of the at least one antenna allow the evaluation of the status of a material comprising the internal walls and/or the bottom of the ladle chamber.

7. Next, at step 170, if applicable, restoring the at least one antenna.

8. Next, at step 180, transferring the collected data to a computer-based data processor.

9. Next, at step 190, processing the collected data by means of at least one signal processing method. Preferably, the signal processing method is selected according to a characteristic of the material under evaluation, such as thickness, number of layers, type, and dimensions of materials possibly in relation to the operating frequency band, type of antenna(s) used, specific locations of the antenna(s), or the type of material, such as molten material, being in contact with the material under evaluation.

10. Last, at step 200, determining a status of the material under evaluation, based on the results of the processed data.

Once an evaluation of a material is completed, including the processing of the data collected, a status of such material can be determined. The status of a material may include the thickness, erosion profile, a level or rate of degradation of such material due to various factors, including operational wear, age, and presence of flaws, cracks, and erosion, and a level or rate of penetration of another material into the material under evaluation.

The method may further include a step to reduce the electromagnetic coupling between the at least one antenna and another antenna or a component of the structure supporting the at least one antenna or forming part of or being in the furnace. In addition, those skilled in the art will recognize that the steps above indicated can be correspondingly adjusted for a specific evaluation of a material or a specific type of material under evaluation. In particular, the type of data to be collected may differ in terms of the measurements of the S12 or S21 parameters and/or S11 and S22 parameters, and more specifically, the technique used for processing the collected data.

The present method and apparatus for evaluation of a status of a material have been disclosed herein in an illustrative manner, and it is to be understood that the terminology which has been used is intended to be in a descriptive rather than in a limiting nature. Those skilled in the art will recognize that many modifications and variations of the invention are possible in light of the above teachings. Obviously, many modifications and variations of the invention are possible in light of the above teachings. The present invention may be practiced otherwise than as specifically described within the scope of the appended claims and their legal equivalents.

I claim:

1. An apparatus for evaluating a status of a refractory material forming part of a furnace, wherein said furnace contains a molten material different from said refractory material, said apparatus comprising:

a. at least one antenna physically configured to reduce a plurality of reflections and probe ringing of a radiofrequency signal transmitted or received by said at least one antenna, by a sufficient extent so as to enable detection of a scattered radiofrequency signal after said transmitted radiofrequency signal has been scattered from a remote discontinuity of said refractory material, wherein said at least one antenna is physically configured and positioned such that said transmitted radiofrequency signal minimally reaches an external structure to said furnace, wherein said external structure at least partly surrounds said refractory material and impairs a propagation of said transmitted radiofrequency signal through said external structure, and wherein said at least one antenna is embedded into a portion of said refractory material, disposed between said external structure and said molten material, and is adapted to enable receipt of said scattered radiofrequency signal from said remote discontinuity of said refractory material within a time period sufficient to distinguish between said scattered radiofrequency signal and reflected spurious signals from other discontinuities;

b. a transceiver capable of generating said radiofrequency signal transmitted by said at least one antenna and detecting said radiofrequency signal received by said at least one antenna, wherein said transceiver is electromagnetically coupled to said at least one antenna;

c. a primary computer-based processor comprising a data storage device and an executable computer code configured to measure said received scattered radiofrequency signal to produce either time domain data or frequency domain data that is transformed to time domain data; calibrate said time domain data to distance domain data; identify a peak of magnitude in said distance domain profile associated with said remote discontinuity of said refractory material; and determine a distance traveled by said received scattered radiofrequency signal; and d. a connection channel that enables coupling of said at least one antenna with at least one of said transceiver and said primary computer-based processor, wherein said connection channel comprises at least one element selected from a group of a transmission line, a communication line, a control line, and a power line, and wherein said connection channel may be configured by means of at least one of a set of cables and wirelessly.

2. The apparatus of claim 1, wherein said antenna comprises a pyramidal horn antenna having a rectangular cross-section and comprising a first flared plate having a planar section and two flared sections along opposite side edges of said planar section of said first flared plate, and a second flared plate positioned opposite said first flared plate, said second flared plate comprising a planar section and two flared sections along opposite side edges of said planar section of said second flared plate.

3. The apparatus of claim 2, wherein a thickness of at least one of said first flared plate and said second flared plate is variable.

4. The apparatus of claim 2, wherein a thickness-to-length ratio of at least one of said first flared plate and said second flared plate is within the range of 15% to 85%.

5. The apparatus of claim 2, wherein at least a portion of a volumetric region between said first flared plate and said second flared plate comprises a dielectric material, which extends beyond said two flared sections along said opposite side edges of said planar section of at least one of said first flared plate and said second flared plate.

6. The apparatus of claim 1, wherein said at least one antenna is designed and physically configured to operate embedded in and be inherently impedance-matched to said refractory material.

7. The apparatus of claim 1, wherein said at least one antenna is embedded in at least one casted portion of said refractory material.

8. The apparatus of claim 1, wherein at least part of at least one of said transceiver and said primary computer-based processor is embedded in said refractory material.

9. The apparatus of claim 1, wherein said external structure at least partly surrounding said refractory material comprises an element selected from a group of a shell made of conductive material forming part of said furnace, a grating structure providing additional mechanical support to said furnace, and a structure disposed nearby said furnace.

10. The apparatus of claim 1, wherein said status of said refractory material to be evaluated is an element selected from a group of a thickness of said refractory material, a flaw of said refractory material, and a level of penetration of said molten material into said refractory material.

11. The apparatus of claim 1, wherein said at least one antenna is positioned according to at least one element selected from a group of an antenna radiation pattern of said at least one antenna, an electromagnetic coupling effect and potential interference between said at least one antenna and other elements surrounding said at least one antenna, a location of said external structure, and an area of interest of said refractory material under evaluation.

12. The apparatus of claim 1, comprising a plurality of antennas arranged in a plurality of sets of antennas, wherein each set of said plurality of sets of antennas is controlled by a secondary computer-based processor, and wherein said secondary computer-based processor is controlled by said primary computer-based processor.

13. The apparatus of claim 1, wherein said primary computer-based processor is configured to enable the implementation of at least one of a time-domain and a frequency-domain signal processing technique to process said set of data for determining and visualizing said status of said refractory material and estimating a remaining operational life and maintenance plan of said furnace.

14. The apparatus of claim 1, wherein said refractory material and said external structure have a physical configuration to allow a routing of said connection channel, and wherein said physical configuration includes grooves, holes, indentations, cuts, ducts, and passages.

15. The apparatus of claim 1, wherein said connection channel comprises at least one cable capable of withstanding high temperatures of at least 500° C.

16. An apparatus for evaluating a status of a refractory material forming part of a furnace, while said furnace is not in operation and is fully or partially empty, said apparatus comprising:
  a. at least one antenna physically configured to reduce a plurality of reflections and probe ringing of a radiofrequency signal transmitted or received by said at least one antenna, by a sufficient extent so as to enable detection of a scattered radiofrequency signal after said transmitted radiofrequency signal has been scattered from a remote discontinuity of said refractory material, wherein said at least one antenna is physically configured and positioned such that said transmitted radiofrequency signal minimally reaches an external structure to said furnace, wherein said external structure at least partly surrounds said refractory material and impairs a propagation of said transmitted radiofrequency signal through said external structure, wherein said at least one antenna is positioned inside a chamber of said furnace where a molten material is processed and said at least one antenna is adapted to enable receipt of said scattered radiofrequency signal from said remote discontinuity of said refractory material within a time period sufficient to distinguish between said scattered radiofrequency signal and reflected spurious signals from other discontinuities, and wherein said at least one antenna is positioned at a position selected from a group of substantially at the center of said chamber, offset from said center of said chamber, and contiguous to an internal wall of said refractory material;
  b. a transceiver capable of generating said radiofrequency signal transmitted by said at least one antenna and detecting said radiofrequency signal received by said at least one antenna, wherein said transceiver is electromagnetically coupled to said at least one antenna;
  c. a primary computer-based processor comprising a data storage device and an executable computer code configured to measure said received scattered radiofrequency signal to produce either time domain data or frequency domain data that is transformed to time domain data; calibrate said time domain data to distance domain data; identify a peak of magnitude in said distance domain profile associated with said remote discontinuity of said refractory material; and determine a distance traveled by said received scattered radiofrequency signal; and
  d. a connection channel that enables coupling of said at least one antenna with at least one of said transceiver and said primary computer-based processor, wherein said connection channel comprises at least one element selected from a group of a transmission line, a communication line, a control line, and a power line, and wherein said connection channel may be configured by means of at least one of a set of cables and wirelessly.

17. The apparatus of claim 16, wherein said external structure at least partly surrounding said refractory material comprises an element selected from a group of a shell made of conductive material forming part of said furnace, a grating structure providing additional mechanical support to said furnace, and a structure disposed nearby said furnace.

18. A method for evaluating a status of a refractory material forming part of a furnace, comprising:
  a. providing at least one antenna physically configured to reduce a plurality of reflections and probe ringing of a radiofrequency signal transmitted or received by said at least one antenna, by a sufficient extent so as to enable detection of a scattered radiofrequency signal after said transmitted radiofrequency signal has been scattered from a remote discontinuity of said refractory material, wherein said at least one antenna is physically configured and positioned such that said transmitted radiofrequency signal minimally reaches an external structure to said furnace, wherein said external structure at least partly surrounds said refractory material and impairs a propagation of said transmitted radiofrequency signal through said external structure, and wherein said at least one antenna is embedded into a portion of said refractory material, disposed between said external structure and said molten material, and adapted to enable receipt of said scattered radiofrequency signal from said remote discontinuity of said refractory material within a time period sufficient to distinguish between said scattered radiofrequency signal and reflected spurious signals from other discontinuities;

b. positioning said at least one antenna such that said transmitted radiofrequency signal impinges upon a predefined area of interest of said refractory material under evaluation and said received scattered radiofrequency signal scatters from said predefined area of interest of said refractory material under evaluation, according to at least one element selected from a group of an antenna radiation pattern of said at least one antenna, an electromagnetic coupling effect and potential interference between said at least one antenna and other elements surrounding said at least one antenna, a location of said external structure, and said area of interest of said refractory material under evaluation;

c. transmitting at least one radiofrequency signal, using a transmitter and said at least one antenna, such that said at least one transmitted radiofrequency signal impinges upon said area of interest of said refractory material under evaluation;

d. detecting at least one radiofrequency signal, using a receiver and said at least one antenna, after said at least one transmitted radiofrequency signal has impinged upon said area of interest and has scattered from said remote discontinuity of said refractory material under evaluation; and e. determining said status of said refractory material based upon a determined distance traveled by said detected radiofrequency signal scattered from said remote discontinuity of said refractory material under evaluation.

19. The method of claim 18, further comprising:
a. measuring and recording a set of data pertaining to said at least one detected radiofrequency signal to produce recorded data;
b. transforming said recorded data, if applicable, to time domain data;
c. calibrating said time domain data to a distance domain data;
d. identifying a peak in said distance domain data associated with said detected radiofrequency signal scattered from said remote discontinuity of said refractory material under evaluation;
e. determining a distance traveled by said detected radiofrequency signal scattered from said remote discontinuity of said refractory material under evaluation; and
f. determining said status of said material based upon a determined distance traveled by said detected radiofrequency signal scattered from said remote discontinuity and at least one signal processing method, selected according to a characteristic of said refractory material, a characteristic and said positioning of said at least one antenna, and a type of molten material being in contact with said refractory material under evaluation.

20. The method of claim 18, wherein said at least one antenna is embedded in at least one casted part of said refractory material.

21. The method of claim 18, wherein said external structure at least partly surrounding said refractory material comprises an element selected from a group of a shell made of conductive material forming part of said furnace, a grating structure providing additional mechanical support to said furnace, and a structure disposed nearby said furnace.

* * * * *